(12) United States Patent
Rubboli

(10) Patent No.: US 7,954,399 B2
(45) Date of Patent: Jun. 7, 2011

(54) STEERING CONTROL FOR SELF-PROPELLED VEHICLES

(75) Inventor: Gian Mario Rubboli, Milan (IT)

(73) Assignee: Aphrodite Agencies Limited, Jersey (GB)

( * ) Notice: Subject to any disclaimer, the term of this patent is extended or adjusted under 35 U.S.C. 154(b) by 1178 days.

(21) Appl. No.: 11/190,869

(22) Filed: Jul. 28, 2005

(65) Prior Publication Data

US 2006/0022442 A1    Feb. 2, 2006

(30) Foreign Application Priority Data

Jul. 29, 2004 (CH) ........................................ 1275/04
Feb. 15, 2005 (CH) ........................................ 0256/05

(51) Int. Cl.
*B62D 1/04* (2006.01)
*B62D 1/06* (2006.01)
*G05G 1/10* (2006.01)
*H01H 9/00* (2006.01)
*H05B 1/02* (2006.01)

(52) U.S. Cl. .......... 74/552; 74/558; 200/61.57; 219/497

(58) Field of Classification Search ............... 74/552, 74/558; 148/440; 200/61.57, 83 Z; 219/497; 180/272; *B62D 1/04*
See application file for complete search history.

(56) References Cited

U.S. PATENT DOCUMENTS

| | | | | |
|---|---|---|---|---|
| 2,105,611 A | * | 1/1938 | Olson | 200/83 Z |
| 2,946,869 A | * | 7/1960 | Parks et al. | 200/61.57 |
| 3,585,626 A | * | 6/1971 | Tartarini | 180/272 |
| 3,876,844 A | * | 4/1975 | Scherenberg | 200/61.57 |
| 5,207,713 A | * | 5/1993 | Park | 74/558 |
| 5,573,606 A | * | 11/1996 | Evans et al. | 148/440 |
| 6,509,552 B1 | * | 1/2003 | Roske et al. | 219/497 |
| 2004/0025624 A1 | * | 2/2004 | Kreuzer | 74/552 |
| 2004/0168540 A1 | * | 9/2004 | Weiss | 74/552 |
| 2005/0268744 A1 | * | 12/2005 | Embach et al. | 74/551.9 |
| 2010/0256946 A1 | * | 10/2010 | Carresjo et al. | 702/138 |

FOREIGN PATENT DOCUMENTS

EP    1216911        6/2002
JP    3-279074    *  12/1991

OTHER PUBLICATIONS

Webster's II New Riverside University Dictionary, 1994, pp. 357 and 426.*

* cited by examiner

*Primary Examiner* — Vinh T. Luong
(74) *Attorney, Agent, or Firm* — Greenblum & Bernstein, P.L.C.

(57) ABSTRACT

A steering control for vehicles, such as for automobiles or motorcycles in the form of a steering wheel or of a handlebar, with a gripping zone presenting an elastically variable geometry deformable under the action of the hand or the hands of the driver gripping the steering control fast and forcefully in case of danger. Thus, in the event of panic, an hydraulic or pneumatic sensor located inside the gripping zone is activated. The sensor extends over essentially the whole gripping zone of the steering control that can be gripped by at least one hand of the driver, and includes a tube of elastic material, filled with a liquid, and embedded entirely in a foamed plastic material. The steering control exhibits then high effectiveness and reliability of a safety device, in the elimination of potential danger caused by mistaken reactions of the driver, and in the economic feasibility of the inventive device.

18 Claims, 3 Drawing Sheets

STEERING CONTROL FOR SELF-PROPELLED VEHICLES

CROSS-REFERENCE TO RELATED APPLICATIONS

The present application claims priority under 35 U.S.C. §119 of Swiss Patent Application No. 01275/04 filed Jul. 29, 2004 and of Swiss Patent Application No. 00256/05 filed Feb. 15, 2005.

BACKGROUND OF THE INVENTION

1. Field of the Invention

The present invention concerns a steering control for self-propelled vehicles, such as motorcycles, automobiles, etc., including a sensor that reacts to deviations in the shape or volume of a gripping zone of the steering control, and in which the sensor is connected to a control or monitoring element that is activated by reaction of the sensor.

2. Discussion of Background Information

A steering control device of the type mentioned is described in detail in commonly owned EP121691 1A2. This patent application thus constitutes the state of the art pertaining to the present invention, which aims at presenting an improvement of the same. The entire contents of the EP1216911 A2 thus is integrated into the description of the present patent application.

The EP-1216911A2 document describes and shows a steering control in a steering wheel of an automobile, or of a handlebar of a motor cycle, provided with a gripping zone of elastically variable geometry, inside which an electric, a pneumatic, or a hydraulic, sensor is located. This sensor reacts to changes to the form and/or the volume of the gripping zone. The sensor according to the invention is connected to at least one control element and/or to a device monitoring the functionality of the vehicle in such a manner that the safety control device is activated by the reaction of the sensor.

Practical realization of the concept described in EP-1216911A2 led to the experience that this concept calls for improvements that considerably increase the driving safety of the vehicle. Such improvements thus are the objective of the present invention.

A first finding from practical experience indicates that pneumatic sensors, and still better, hydraulic sensors, present reliable functionality as they permit—other than the ones using electrical micro-switches reacting to elastic deformation of the steering control, as already known from the general state of the art—picking up an analogue signal of the pressure exerted by the hand onto the steering wheel or handlebar. A signal of this type presents the great advantage over a signal of digital open/closed type emitted by an electric switch, of reproducing in simple but correct form—without complex electronic devices—the quality of the reactions of the driver, i.e., the degree of driver fear or panic induced by unexpected and unforeseeable situations.

SUMMARY OF THE INVENTION

The present invention creates a steering control system for vehicles, which is capable of improving the preventive and active safety of the driver of the vehicle, as well as of the other users of the road—pedestrians in particular—by considerably reducing reaction time lag of the driver, and correspondingly shortening braking distance. A length of a few meters difference in the braking distance can prove vital in avoiding a crash, or in reducing the effects of a crash. This is confirmed every day on the road.

On the other hand, it is known that in the case of unexpected danger situations (e.g., pedestrians or animals unexpectedly crossing the road, obstacles appearing suddenly after a curve, sudden left turns by a cyclists, etc.) the driver, according to a first form of reaction, instinctively tends to grip the wheel or the handlebar with greater or lesser force and speed in function of the degree of panic he suffers. Another form of reaction, often seen in practical traffic, and differing from the one of gripping the wheel or the handlebar described above, is the one of leaning with both hands onto the rim of the steering wheel, pressing both palms hard against it. This is an instinctive and most rapid reaction aimed at protecting the thorax region from impacting the wheel in case of brisk deceleration of the vehicle for any reason, e.g., because of an obstacle e.g., a pedestrian, seen suddenly in front of the vehicle. The hands in this case press hard, with strong force corresponding to an acceleration of 2 to 3 G, against the upper surface of the steering wheel rim oriented towards the driver. The instant invention uses this force for activating a pneumatic or hydraulic sensor located in the upper portion of the rim of the steering wheel. Accordingly, the hydraulic or pneumatic sensor provides the possibility of obtaining a signal proportional to the driver's perception of danger, i.e., a signal constituting a noticeable progress over all sensors operating with a simple electrical switch, which can only emit on/off signals that do not account for the speed of the driver's reaction nor for the force of his reaction or, respectively, for his "degree of panic".

A second aspect is that the whole extent of the steering control (i.e. the whole circumference of the steering wheel in the case of an automobile, or the whole length of the handlebar, in the case of vehicle with a handlebar) is to be used as an activating zone for the hydraulic or pneumatic sensor. Expressed in other words: Practical use has shown that, while driving a vehicle, the driver tends to shift his hand—or both his hands, if he applies them both—along the whole surface of the rim of the steering wheel or, respectively, along the whole length of the handlebar. Thus, it never can be known precisely, where the hand or the hands of the driver contact or hold the steering control. Of course there are favored zones, such as the two sides to the right or left hand side, or the upper and the lower zone of the steering wheel rim. But it is impossible to foresee precisely at which point the driver, in an emergency or panicking situation, will grip the wheel or the handlebar. For this reason the solution shown in EP-121691 1A2 cannot entirely satisfy the conditions for effectiveness required for a safety device such as the one considered here.

The present invention eliminates the disadvantages cited above in the state of the art and offers the market a solution, which ensures maximum effectiveness in all panic situations of the driver, independently of his driving habits or the manner in which the driver holds the steering wheel while driving.

Accordingly, the present invention provides a steering control having hydraulic or pneumatic sensors extending over essentially the entirety of the steering control, wherein the sensors comprise a tube of elastic material filled with a fluid.

Best assurance is obtained that the sensor can be activated securely, whatever the situation, based upon the positioning of at least one hydraulic or pneumatic sensor extending essentially over the whole zone of the steering control, e.g., steering wheel of an automobile or handlebar of a motorcycle, that may be gripped by at least one hand of the driver of the vehicle. For obtaining this result, the invention includes at least one sensor which is a hydraulic or pneumatic sensor able to transmit an increase in pressure at any of its points to a receiving device. The sensor is composed of a tube of elastic material immersed in expanded foam plastic material. The final elasticity of the foam plastic material, i.e., after hardening of the material, is lower than the elasticity of the material forming the tube. Owing to this characteristic, the pressure exerted by the hands (or by one hand only) onto the plastic foam material completely surrounding the tube of the sensor (forming the rim of the steering wheel or the cylindrical body of the handlebar) is immediately transmitted to the tube, which in turn transmits it to the fluid contained in the tube, in such a manner that the pressure increases inside the tube. A signal receiver can be a pressure gauge, e.g., an analog electric device, the signal of which can be processed in many different modes (e.g., the start of the braking action, switching on of warning lights, etc.) in an effort to reduce the dangers generated by the panic situation causing the driver's brisk reaction. According to the invention, the pressure gauge can be calibrated in such a manner that it emits a signal only if the pressure increase in the sensor-tube exceeds a predetermined value, in order to avoid undesired reactions of the system due to mere inattentiveness of the driver.

Other exemplary embodiments and advantages of the present invention may be ascertained by reviewing the present disclosure and the accompanying drawing.

BRIEF DESCRIPTION OF THE DRAWINGS

Embodiments of the present invention are described and discussed in more detail with reference to the following description illustrated in corresponding Figures. The Figures show in.

DETAILED DESCRIPTION OF THE PRESENT INVENTION

Figure 1:
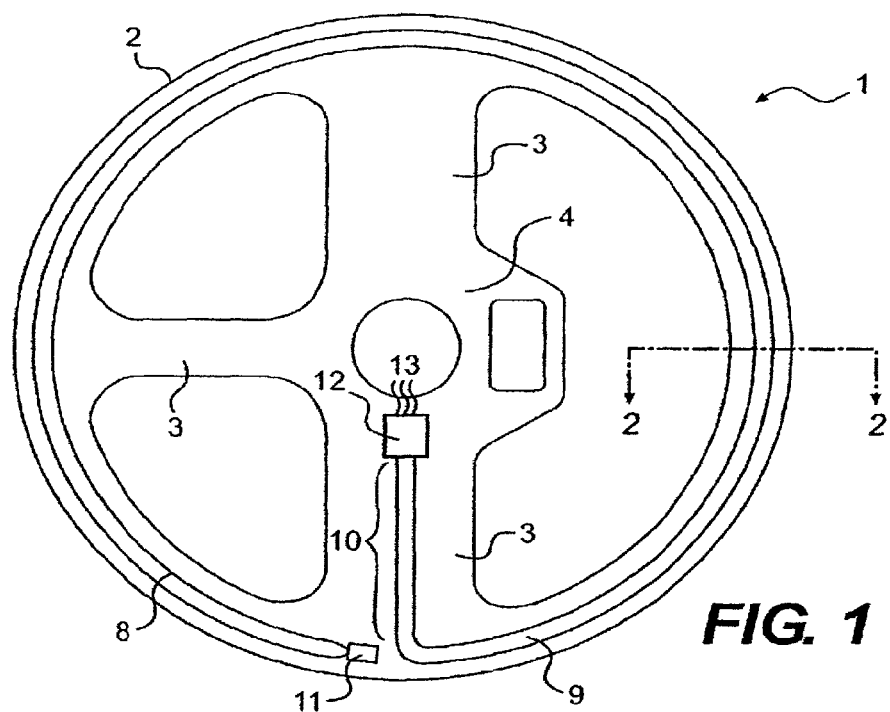
FIG. 1 shows an inventive steering control in the form of a steering wheel of an automobile shown schematically in a view from below.
Figure 4:
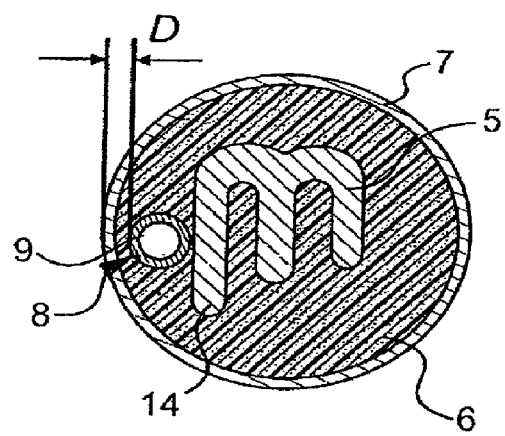
FIG. 4 shows an alternative arrangement of the tube-shaped sensor in a steering wheel of an automobile for realizing the present invention.

A steering wheel 1 of an automobile, viewed from the rear (i.e., from the lower portion), is shown in FIG. 1. Steering wheel 1 may be of conventional type and comprises a rim 2 and a number of spokes 3 (often two or three spokes) connecting the rim 2 with the steering column 4. The specific layout of the steering wheel 1 (namely the diameter of the rim, the number of spokes, the specific shape of the steering column head 4) plays a minor role within the scope of the invention and, thus, is not discussed in more detail here. It just is to be noted that modern steering wheels of automobiles as a rule contain a support structure (skeleton) made from light metal alloys (magnesium in particular) for lending the steering wheel the strength required and the indispensable safety characteristics. A skeleton (or frame) 5 of such type presents, e.g., an M-shaped profile (see FIG. 2, in which the cross-section of the rim of the steering wheel 1 along the line II-II of the FIG. 1 is shown) and of course comprises the spokes 3 and the steering column head 4 (not visible in the figures). The skeleton (or frame) 5 normally is embedded at least partially, especially in its rim portion, in a plastic foam material 6 of predetermined elasticity, in such a manner that its touch is pleasant and assures good grip. The elasticity of the foam plastic material 6 plays a particular role within the scope of the present invention, which will be described infra. In FIG. 4 it can be seen that the plastic foam material 6 is enclosed in a cover 7 of soft leather or half-leather in order to further improve the surface properties of the steering wheel. However, it is noted that cover 7 is generally provided merely for aesthetic purposes to generally improve the look and feel of the steering wheel.

As discussed above with respect to the state of the art of steering wheels and handlebars, the plastic foam material is elastic and can undergo local elastic deformation under the influence of the pressure exerted by a hand that grips the wheel, or exerted just by a finger pressed onto the surface. The plastic foam material can be, e.g., expanded polyurethane or a material presenting characteristics similar to polyurethane. The present invention utilizes this local elastic deformation in order to obtain the desired safety effect. With respect to elastic deformation, it is noted that this expression can refer to the local deviation of the form of the gripping zone as well as to the reduction in its volume; i.e., the present invention can utilize both cases in practical application, depending on whether the wheel rim is pressed by a hand that grips the wheel, or whether it is pressed locally. From the viewpoint of the present invention, the two cases are similar in that they generate similar effect, as discussed infra.

The present invention provides that the hydraulic or pneumatic sensor 8 extends essentially over the whole zone of the steering control, e.g., of the steering wheel 1 or handle bar, which can be gripped by at least one hand of the driver (not shown). In the case of the specific item shown in FIGS. 1 through 5, as the whole rim 2 can be gripped or held by the driver, the gripping zone extends essentially over the entire rim 2 of the steering wheel 1. In the case of the handlebar of a motorcycle (not shown) the gripping zone extends over the full length of the handlebar. In this manner, the safety system will function at whatever point the driver grips or holds the steering control because the hydraulic or pneumatic sensor extends over the full expanse of the gripping zone. In this arrangement, the characteristics of a fluid contained in a tube can be utilized so that pressure applied at any point along the tube is propagated throughout the tube. The present invention provides that the sensor 8 is comprised of a tube 9 of elastic material, filled with a fluid 10 (see FIG. 3), which can be embedded in foamed plastic material 6 (see FIGS. 2 and 4). The final elasticity of the expanded foam material 6 (where the term "final" refers to the elasticity after completion of the hardening phase of the expanded foam material 6) preferably is equal to or lower than the elasticity of the material from which the tube 9 is formed. This may be advantageous in that the tube 9 of the sensor 8 does not oppose any useless resistance against compression from the outside, in order not to render the combination of the foam material 6/tube 9 needlessly inert against pressure loads. Thus, tube 9 is not provided to oppose pressures, but is to transmit them to the fluid 10 filling tube 9 to react to any, and even the smallest, deforming loads acting onto the foam material surrounding the tube 9.

In the FIG. 1 exemplary embodiment, tube 9 is placed in rim 2 to form the sensor 8, surrounds practically the whole circumference of the steering wheel 1, and extends towards the steering column 4 via one of the spokes 3 to form a portion curved 90° (radially) with respect to the circumference of the rim 2.

Figure 3:
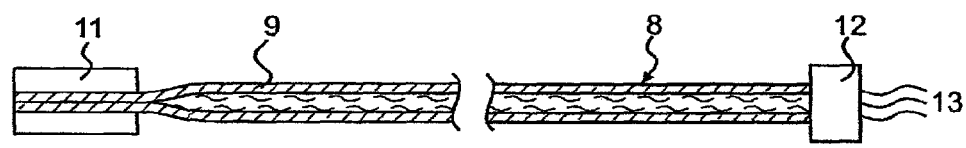
FIG. 3 shows the tube-shaped sensor located inside the inventive steering control.

According to the exemplary embodiment shown in FIG. 1 as well as in FIG. 3, the tube 9 is sealed tight at one end by a sealing clip 11, whereas the other end is connected to a pressure gauge with an electrical analogue measuring value transmitter 12 that transmits signals via suitable circuits 13 to a signal processing unit processing the signal conveniently, e.g., the on-board computer. Obviously, there are solutions other than clips for sealing a tube 9, and also for connecting a tube under pressure to a pressure gauge furnishing an analogue electric signal that correspond to the state of the art. All such solutions are applicable within the frame of the present invention.

In accordance with an embodiment of the invention, a hydraulic sensor 8, which includes a tube 9 as described above, is filled with a liquid that preferentially presents minimum thermal dilatation within the temperature range from −40° C. to +100° C. The advantage of this solution is self-evident. The liquid is essentially incompressible and thus reacts faster and with higher precision than a pneumatic sensor filled with a compressible gas. The smallest possible thermal dilatation within the range of temperatures cited is desirable, as this permits elimination of possible deviations in pressure occurring in the steering control exposed to outside conditions in the environment. The steering wheel of an automobile must remain functional notwithstanding considerable temperature excursions, such as those found between polar and equatorial regions. If required, modification of the calibration of the pressure gauge 12, as a function of the average temperature at which the automobile is used, can be performed.

Figure 2:
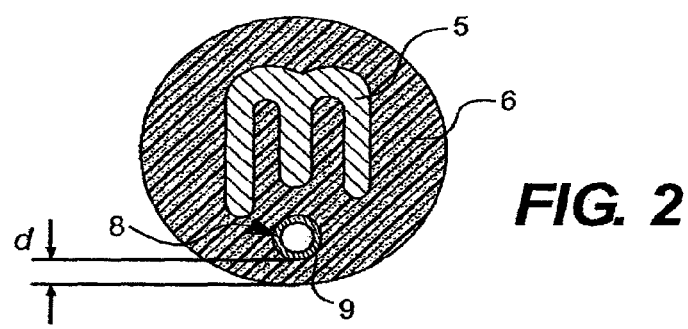
FIG. 2 shows a cross-section of the rim of the steering wheel along the line II-II in the FIG. 1.

According to an embodiment of the present invention, FIG. 2 illustrates a cross-section of the steering control along the line II-II depicted in FIG. 1. The steering control can be, e.g., the steering wheel 1 of an automobile (as shown in the FIG. 1), and the hydraulic or pneumatic sensor 8 can be arranged along the whole circumference of the steering wheel 1 (as shown in FIG. 1) in its lower portion, at a distance d, ranging from 1 to 6 mm from the surface of the steering wheel 1 and under the magnesium skeleton 5. In accordance with this arrangement, sensor 8 is apt to be actuated when pressed by a finger or by the hands. Most drivers instinctively grip the wheel 1 laterally with the palm of the hand, in such a manner that the fingers, except the thumb, are placed on the lower portion of the steering wheel rim. If the hand tightens, the fingers tend to press the wheel rim, putting a load onto the foamed plastic material 6 upwards from below, thus compressing the tube 9 of the sensor 8. This location of the sensor 8 is advantageous for realizing the present invention.

According to another embodiment of the present invention, FIG. 4, which is a cross-section of the steering control similar to that depicted in FIG. 2, depicts the steering control, e.g., a steering wheel 1 of an automobile, where the hydraulic or pneumatic sensor 8 is arranged on the outer side along the whole circumference of the steering wheel rim at a distance D, ranging from 1 to 6 mm, from the surface of the steering wheel 1. It is noted that in the embodiment shown in FIG. 4, the surface of the steering wheel is covered with a thin layer 13 of leather or half-leather. The cover layer 13 is provided to protect the expanded plastic foam material 6, and also to improve the grip on the wheel 1 for the driver. The distance D thus is measured from the outer surface of the cover layer 13.

The advantage of this embodiment is seen in that the sensor 8 is located in a lateral position of the wheel 1, where it can be deformed easily as the driver grips the wheel and tends to pull back his arms.

In FIG. 4 it also can be seen that the elastic tube 9 of the sensor 8, via its guide element, rests directly against one of the vertical protrusions or arms of the support structure 5. This represents an advantageous solution facilitating manufacture of the steering wheel, but does not play any particular role within the scope of the present invention.

Figure 5:
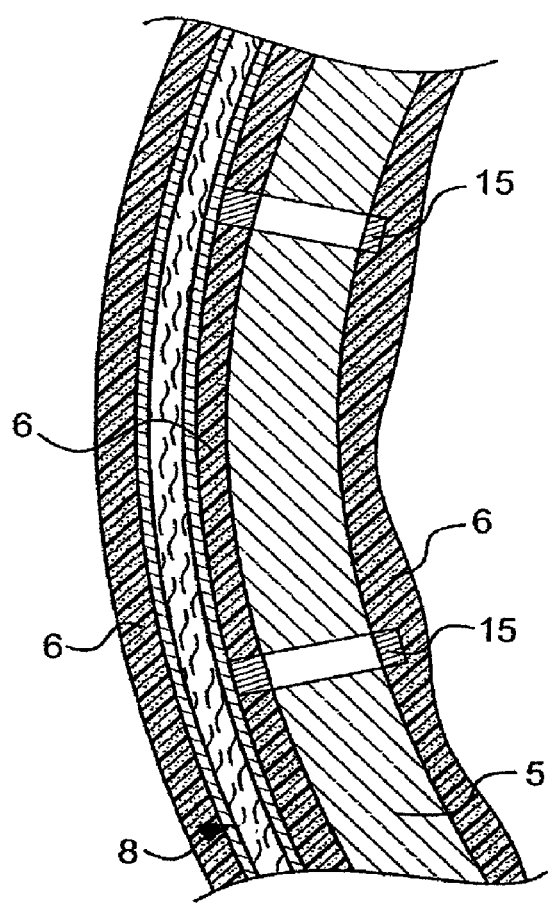
FIG. 5 shows a section along a zone of the steering wheel of an automobile, in which the tube-shaped sensor is placed in the outer portion (as shown in the FIG. 4), but with additional support elements against which the tube rests.

In a further advantageous solution, the steering wheel 1 can, as shown in the FIGS. 2, 4 and 5, include a support structure or skeleton 5 embedded entirely or partially in the expanded plastic foam material 6, where the structure 5 comprises a steering column head, spokes and a wheel rim (not shown in their details, but corresponding to the steering column head 4, the spokes 3 and the wheel rim 2 of the foam material forming the steering wheel 1) made from light metal alloys, preferably magnesium, and the tube 9 of the sensor 8 rests against at least one point of the support structure 5. This solution is shown in FIG. 5, in which support blocks 15 of suitable shape (shown schematically in FIG. 5) are arranged on the support structure 5, e.g., using normal distancing clips, against which the tube 9 of the sensor 8 rests. This solution proves suitable for facilitating the foam expanding process in the manufacture of the steering wheel 1, i.e., the processing step during which the foam material is brought into the mould at relatively high pressure (e.g., at 5 to 6 kg/cm2), which could cause shifting of the tube 9 with respect to the support structure 5. Thus, support blocks 15 serve as a fixation of the position of the tube 9 during this manufacturing step of the steering wheel, ensuring the correct position of the tube 9. Obviously, the two positioning solutions shown in the FIGS. 2 and 4 can be applied together if two sensors 8 in form of a tube 9 are provided. The two positioning solutions can also be applied together if just one sensor 8 in form of a tube 9 is provided by alternately placing the tube 9 along the circumference of the steering wheel 1 in the positions indicated in FIG. 2 and FIG. 4, or by changing from one position to the other according to the zone of the steering wheel concerned.

According to an embodiment of the present invention, tube 9, or 17 respectively, presents an outside diameter ranging from 2 to 6 mm, and is made from a plastic material such as silicone, EVA (vinyl-ethylene acetate) or a similar material.

Figure 6:
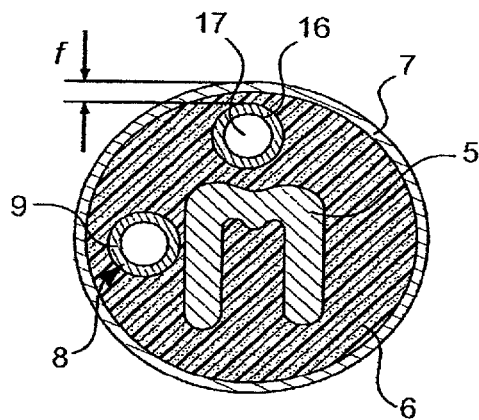
FIG. 6 shows an alternative variant of the inventive steering control as shown in the FIGS. 1 through 5, but equipped with two tube-shaped sensors, one of which is located in the outer rim portion of the wheel, and the other one of which is located in upper portion of the rim of the wheel.
Figure 7:
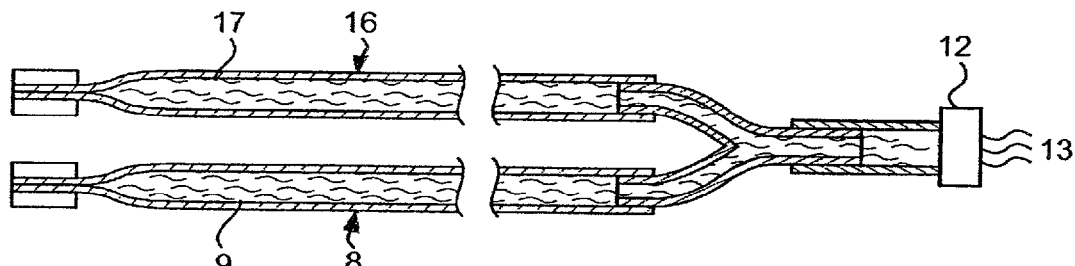
FIG. 7 shows a design detail of the solution according to the FIG. 6 showing the manner in which the two sensor tubes merge into one pressure gauge.

Another preferred form of the present invention is illustrated in FIGS. 6 and 7, which show the solution in which the sensor 16 is located in the upper (front) portion of the steering wheel 1, i.e., on the side facing the driver, along its whole circumference. This solution permits rapid protective reaction, when the driver, as an unexpected obstacle emerges in front of the vehicle, such as a pedestrian crossing the road without watching the traffic, pushes hard against the steering wheel with both hands in order to protect himself against a seemingly unavoidable collision. This is commonly the driver's first instinctive reaction. The sensor 16 thus reacts immediately and activates the predetermined protective measures. As shown in FIG. 6, two sensors 8 and 16 can jointly be placed in the rim of the steering wheel in the radially outer portion and in the upper (front) portion of the steering wheel, respectively. This layout permits realization of a double chance of reaction in one arrangement, and thus permits doubling the degree of safety.

In FIG. 7, two sensors 8 and 16 merge into one single tube in order to activate one single pressure gauge 12. The advantage of this arrangement is obvious. The tube 17 is located in the rim of the wheel at a distance f ranging from 1 to 6 mm from the surface of the steering wheel (see FIG. 6). In another preferred embodiment, the sensor can be a hydraulic sensor having a filling liquid of glycol, silicon or a similar liquid. This liquid is filled into the tube 9, 17, preferably under vacuum during the filling process, so that absolutely no bubbles remain inside the tube 9, 17. Again, this is a manufacturing problem known to any specialist in the field and is not relevant within the scope of the present invention.

Finally, to form the plastic material forming the outer shape of the steering wheel 1, manufacturing experience has shown that, among the many possibilities available, the one providing the application of an expanded polyurethane foam material presents an ideal solution with respect to the elastic characteristics as well as to the ease of manufacture and to cost efficiency. This material represents a preferred choice, but does not exclude the use of other foam materials that can be injected under pressure, or pressed, into a mould.

Everything described here thus far may also be applied to steering wheels of the type where the foaming process determines the final surface of the polyurethane material with mock leather effects. It has been noted that the manufacture of steering wheels to be covered with genuine leather (which operation is called "saddlery" among specialists) preferably must use a more rigid polyurethane material. This increased rigidity causes major difficulties in the process of inserting the tubes of the sensor(s) in the foam material in the mould.

Figure 8:
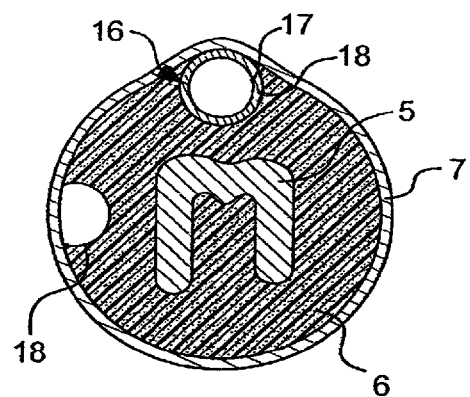
FIG. 8 shows an alternative design example of a steering wheel in which the polyurethane is rigid and the sensor is placed into a peripheral slot milled into the rim.

In this case, the steering wheel (see FIG. 8) preferably is foamed without previous insertion of the tube or the tubes, and later is machined by milling, in order to create the recess or slot 18, into which the tube(s) of the sensor(s) are subsequently placed. Accordingly, a slot 18 is machined into the circumference of the steering wheel at the preferred location (e.g., the bottom portion, outer portion, or upper portion, etc.). This slot 18 is of essentially semicircular cross-section, as shown in FIG. 8, into which the tube 17 of the sensor fits perfectly. The tube 17 must protrude from the polyurethane surface over just 6 to 8% of its total diameter. This solution is applied where the relative hardness of the polyurethane precludes sufficient elastic local deformation of the tube.

The advantages of the steering control according to the present invention, especially its application in its preferred form of a steering wheel 1 of an automobile can be summarized as follows:

1) Absolute effectiveness and reliability as the danger sensor functions in whatever position the hands of the driver contact the wheel, taking into account also the fact that scientific tests have proven that the hands react faster than the feet, and that thus the safety systems monitoring the hands of the driver, like the one according to the present invention, prove more efficient.

2) The sensor 8, 16 can be provided, if the pressure gauge 12 is calibrated correspondingly, in such a manner that it reacts only and exclusively in case of panic of the driver, i.e., in real emergency situations, thus avoiding unnecessary and potentially dangerous reactions of the system due to awkward operation by the driver.

3) The inventive steering control is easily manufactured at low cost and thus can be incorporated in all types of vehicles, e.g., automobiles or motorcycles, including commercial vehicles, thereby enhancing road safety.

LIST OF THE ELEMENTS REFERRED TO IN THE FIGURE

1 Steering wheel
2 Rim of the steering wheel
3 Spoke
4 Steering column head
5 Support structure (skeleton)
6 Expanded foam material
7 Leather cover
8 Hydraulic or pneumatic sensor
9 Tube
10 Fluid
11 Sealing Clip
12 Pressure gauge and transmitter for measured electrical analogue signals
13 Circuits
14 Vertical protrusion or arm of the support structure 5
15 Support block
16 Hydraulic or pneumatic sensor
17 Tube
18 Recess, slot

The invention claimed is:

1. A steering control system for a self-propelled vehicle, comprising:
a steering control comprising a gripping zone of elastically variable shape that can undergo a change in at least one of shape and volume;
at least one sensor provided in the gripping zone structured and arranged to react to said change in at least one of shape and volume of the gripping zone; and
at least one control or monitoring element for operating the self-propelled vehicle, the control or monitoring element being connected to the at least one sensor and being activatable by the at least one sensor;
wherein the at least one sensor comprises a hydraulic or pneumatic sensor comprising a tube filled with a fluid;
the tube extends over essentially an entirety of the steering control; and
the entirety of the steering control comprises a whole circumference of a steering wheel or a whole length of a handle bar,
wherein the tube comprises a first material that is elastically deformable;
the tube is embedded in a second material that is elastically deformable; and
a final elasticity of the second material is equal to or less than an elasticity of the first material; and
wherein when an external pressure is exerted to the second material, said external pressure is immediately transmitted to the tube which in turn transmits said external pressure to the fluid contained inside the tube.

2. The steering control system of claim 1, wherein the first material comprises at least one of silicon and vinyl-ethylene acetate; and
the second material comprises expanded polyurethane foam.

3. The steering control system of claim 1, further comprising:
a clip structured and arranged to seal one end of the tube; and
a pressure gauge and signal transmitter for analog electric measuring values being coupled to another end of the tube.

4. The steering control system of claim 3, wherein the pressure gage is calibrated such that the pressure gage emits a signal only when a pressure increase in the tube exceeds a predetermined value.

5. The steering control system of claim 1, wherein the at least one sensor is the hydraulic sensor and the fluid exhibits minimal thermal expansion over temperatures ranging from −40° C. to +100° C.

6. The steering control system of claim 1, wherein the fluid comprises at least one of glycol and silicon.

7. The steering control system of claim 1, wherein the steering control is formed at least in part as the steering wheel of the self propelled vehicle;
   the at least one sensor is arranged to extend around essentially the entire circumference of the steering wheel; and
   the at least one sensor is disposed 1 mm to 6 mm from an outer surface of the steering wheel.

8. The steering control system of claim 7, wherein the at least one sensor is disposed in a back portion of the steering wheel that faces away from a driver.

9. The steering control system of claim 8, further comprising:
   a support structure that is at least partially embedded in the steering wheel;
   the support structure comprising a steering column head, spokes, and a rim formed from a light metal alloy; and
   the at least one sensor is arranged to rest against at least one portion of the support structure.

10. The steering control system of claim 9, wherein the metal alloy is magnesium.

11. The steering control system of claim 7, wherein the at least one sensor is disposed in a front portion of the steering wheel that generally faces toward a driver.

12. The steering control system of claim 11, further comprising:
   a support structure that is at least partially embedded in the steering wheel;
   the support structure comprising a steering column head, spokes, and a rim formed from a light metal alloy; and
   the at least one sensor is arranged to rest against at least one portion of the support structure.

13. The steering control system of claim 7, wherein the at least one sensor is disposed in a radially outer portion of the steering wheel.

14. The steering control system of claim 13, further comprising:
   a support structure that is at least partially embedded in the steering wheel;
   said support structure comprising a steering column head, spokes, and a rim formed from a light metal alloy; and
   the at least one sensor is arranged to rest against at least one portion of the support structure.

15. The steering control system of claim 1, wherein the tube has an outer diameter of 2 mm to 6 mm.

16. The steering control system of claim 1, wherein the steering control is formed at least in part as a steering wheel of the self propelled vehicle;
   the steering wheel includes a rigid polyurethane foam;
   a recess is formed in the rigid polyurethane foam to extend around a circumference of the steering wheel; and
   the tube is arranged in the recess so that a portion of the tube extends outside of the rigid polyurethane foam.

17. The steering control system of claim 16, wherein the portion of the tube that extends outside the rigid polyurethane foam corresponds to about 6% to 8% of the circumference of the tube; and
   the rigid polyurethane foam is covered by a leather cover.

18. A steering control system for a self-propelled vehicle, comprising:
   a steering control comprising a deformable gripping zone;
   a sensor provided in the gripping zone structured and arranged to react to a change in at least one of shape and volume of the gripping zone; and
   a control or monitoring element for operating the self-propelled vehicle, the control or monitoring element operatively connected to the sensor;
   wherein the steering control comprises a steering wheel comprising a frame surrounded by foam;
   the sensor comprises a tube embedded in the foam;
   the tube extends around substantially an entire circumference of the steering wheel;
   a first end of the tube is sealed;
   a second end of tube opposite the first end is coupled to a pressure gage and a signal transmitter for analog electric measuring values;
   the tube comprises at least one of silicon and vinyl-ethylene acetate;
   a final elasticity of the foam is less than an elasticity of the tube;
   the sensor is a hydraulic sensor and the tube is filled with a fluid;
   the fluid is essentially incompressible; and
   the pressure gage is calibrated such that it the pressure gage emits a signal only when a pressure increase in the tube exceeds a predetermined value.

* * * * *

UNITED STATES PATENT AND TRADEMARK OFFICE
CERTIFICATE OF CORRECTION

| | | |
|---|---|---|
| PATENT NO. | : 7,954,399 B2 | Page 1 of 1 |
| APPLICATION NO. | : 11/190869 | |
| DATED | : June 7, 2011 | |
| INVENTOR(S) | : G. Rubboli | |

It is certified that error appears in the above-identified patent and that said Letters Patent is hereby corrected as shown below:

Title Page, Assignee (73), please insert --St. Helier-- before "Jersey".

At Col. 8, line 67 (claim 5, line 4) of the printed patent, please delete "." after "40°C".

At Col. 10, line 41 (claim 18, line 19) of the printed patent, please delete "it" after "such that".

At Col. 9, line 5 (claim 7, line 2) of the printed patent, please change "self propelled" to --self-propelled--.

At Col. 10, line 5 (claim 16, line 2) of the printed patent, please change "self propelled" to --self-propelled--.

Signed and Sealed this
Seventh Day of February, 2012

David J. Kappos
*Director of the United States Patent and Trademark Office*